Feb. 6, 1951          R. A. EDENS          2,540,937
TOOLHOLDER
Filed March 15, 1947          2 Sheets-Sheet 1
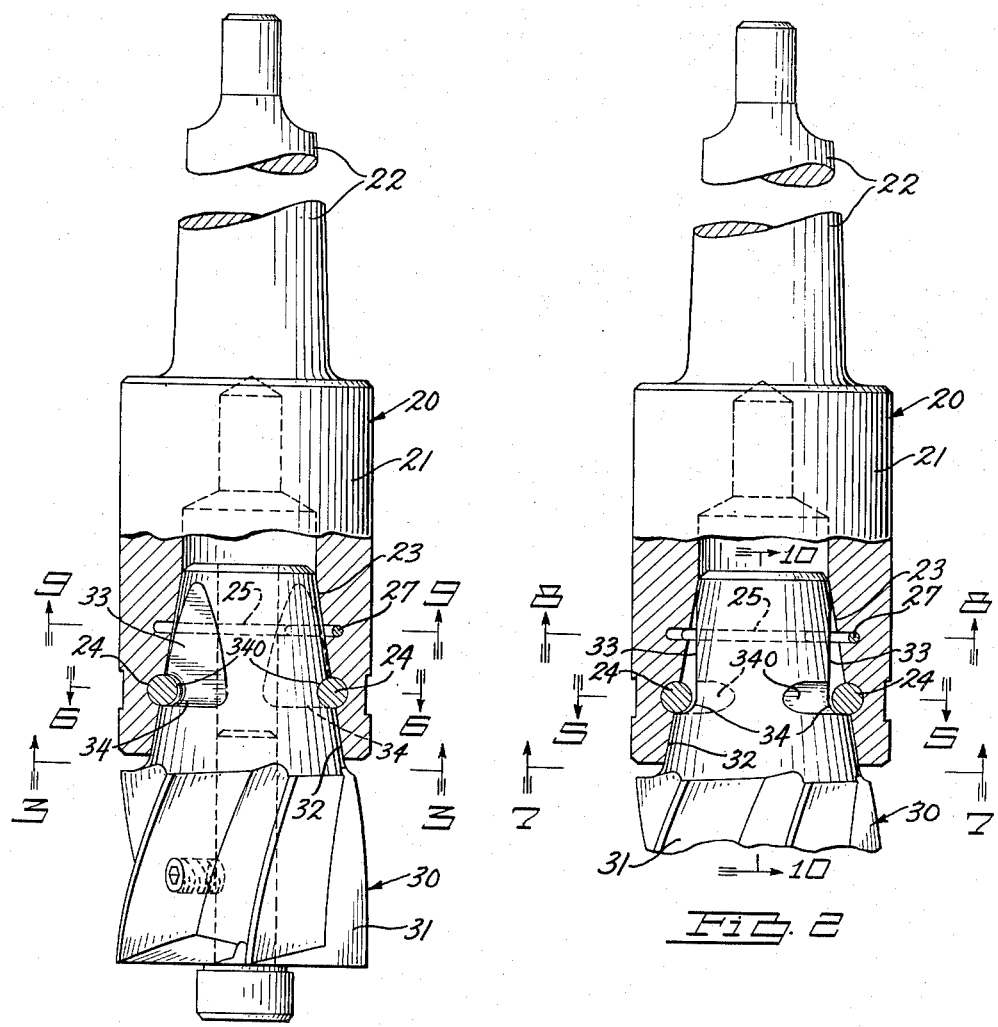
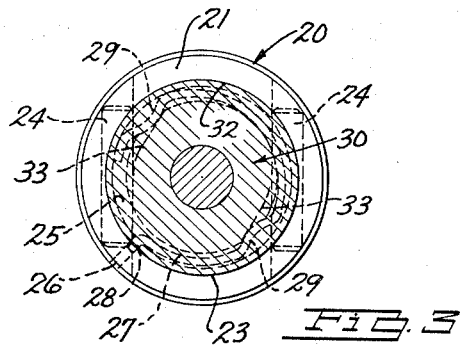
INVENTOR
RALPH A. EDENS
BY
ATTORNEY Feb. 6, 1951 R. A. EDENS 2,540,937
TOOLHOLDER
Filed March 15, 1947 2 Sheets-Sheet 2

INVENTOR
RALPH A. EDENS
BY Everett G. Wright
ATTORNEY

Patented Feb. 6, 1951

2,540,937

UNITED STATES PATENT OFFICE 2,540,937

TOOLHOLDER

Ralph A. Edens, East Detroit, Mich.

Application March 15, 1947, Serial No. 734,996

3 Claims. (Cl. 279—79)

This invention relates to tool holders and in particular to tool holders for tapered shanked cutters, reamers, drills, and the like.

Tapered shanked tools and tool holders therefor are old in the art; nevertheless, much difficulty is encountered with "freezing" or binding of the tapered shank of a tool such as cutters, reamers, drills and the like into the tapered tool holder. Much time in machine and production shops is lost as a result of removing tapered tools from their holders and many tools have been dulled, chipped or broken during removal from their holders.

With the foregoing in view, the primary object of the invention is to provide an improved, accurate and effective tapered tool holder and tool therefor wherein the tool is quick locking and positively non-binding in the holder.

Other objects of the invention will become apparent by reference to the following detailed description taken in connection with the accompanying drawings, in which:

Fig. 1 is a vertical elevational view of a tool holder and tapered shanked tool embodying the invention wherein the tapered shanked tool is shown in its locked working position in the tool holder, portions being broken away to show the construction.

Fig. 2 is a fragmentary view similar to Fig. 1 except that the tapered shanked tool is inserted in the tool holder, but not locked therein.

Fig. 3 is a transverse sectional view taken on the line 3—3 of Fig. 1 looking in the direction indicated by the arrows showing the tapered shanked tool locked within the tool holder.

Figure 4:
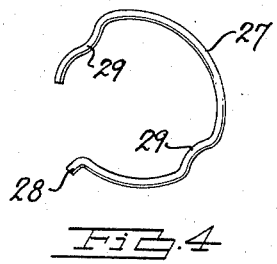
Fig. 4 is a bottom view of the locking spring employed in the tool holder.

Referring now to the drawings wherein like numerals refer to like and corresponding parts throughout the several views, the illustrative embodiment of the invention disclosed therein comprises the combination of a tool holder 20 including a body portion 21 and a tapered shank 22 adapted to fit into the rotating head of a machine tool, the said body portion 21 having a female taper 23 formed axially in the tool holding end thereof, locking pins 24 disposed in parallel relationship through the said body portion 21 near the tool holding end thereof which project into the said female taper 23 on opposite sides thereof, the said body portion 21 having an annular locking spring groove 25 formed in the wall of the female taper 23 thereof spaced axially inward from the said locking pins 24, the said body portion 21 having a locking spring anchorage aperture 26 disposed radially therethrough communicating with the said locking spring groove 25, a locking spring 27 including an anchorage nib 28 and a pair of radially oppositely disposed inwardly extending retainer lugs 29 positioned in the said locking spring groove 25 with the said anchorage nib 28 thereof positioned in the said locking spring anchorage aperture 26, and a tapered shanked tool 30 including a cutting portion 31 and a male tapered shank 32 formed complementary to the female taper 23 in the tool holder 20, the said male tapered shank 32 having flat surfaces 33 formed on opposite sides thereof parallel to the longitudinal axis thereof, and cams 34 formed at the base of the said flat surfaces 33 of the said tapered shank 32 extending counterclockwise circumferentially therefrom partially around the said shank 32 as indicated by the numeral 349, the said cams 34 of the tapered shanked tool 30 engaging the locking pins 24 of the tool holder 20 and firmly holding the said tapered shanked tool 30 in the said tool holder 20 when the said tapered shanked tool 30 is positioned in the said tool holder 20 and turned clockwise as viewed in Fig. 3 whereupon the retainer lugs 29 of the locking springs 27 of the tool holder 20 engage the flat surfaces 33 of the tapered shank 32 of the tapered shanked tool 30 and hold the said tapered shanked tool 30 in the tool holder 20.

Figure 5:
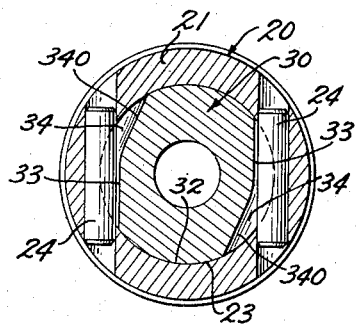
Fig. 5 is a transverse sectional view taken on the line 5—5 of Fig. 2 looking in the direction indicated by the arrows showing the relationship of locking cams of the tapered shanked tool to the locking pins of the tool holder when the tapered shanked tool is inserted but not locked in the tool holder.
Figure 6:
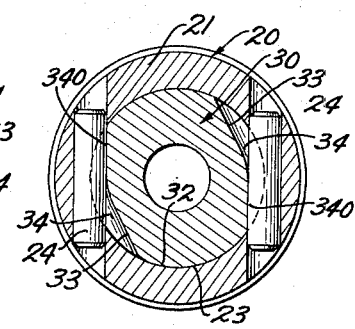
Fig. 6 is a transverse sectional view taken on the line 6—6 of Fig. 1 looking in the direction indicated by the arrows showing the relationship of the locking cams of the tapered shanked tool to the locking pins of the tool holder when the tapered shanked tool is inserted in the tool holder and locked by turning clockwise with respect to the tool holder as viewed in Fig. 6.
Figure 7:
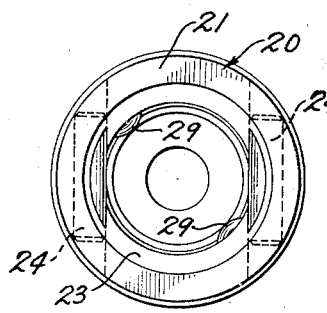
Fig. 7 is a bottom view of the tool holder looking in the direction indicated by the arrows showing the locking spring in its normal position prior to inserting a tapered shanked tool therein.
Figure 8:
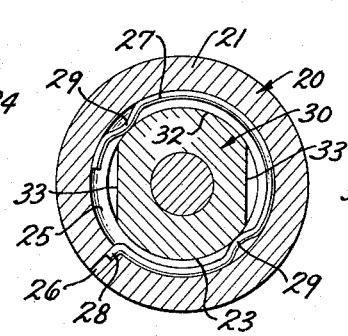
Fig. 8 is a transverse sectional view taken on the line 8—8 of Fig. 2 looking in the direction indicated by the arrows showing the locking spring retracted by the insertion of a tapered shanked tool therein.
Figure 9:
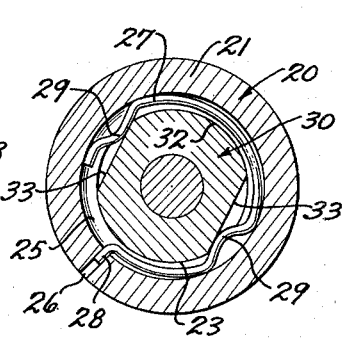
Fig. 9 is a transverse sectional view taken on the line 9—9 of Fig. 1 looking in the direction indicated by the arrows showing the tapered shanked tool inserted therein and turned to a locking position, with the locking spring of the tool holder in engagement with parallel flat surfaces formed on opposite sides of the tapered shank of the tool.
Figure 10:
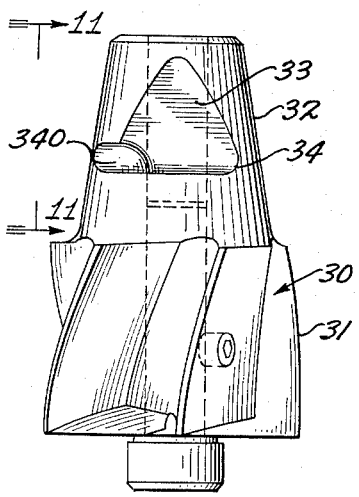
Fig. 10 is a side elevational view of the tapered shanked tool taken on the line 10—10 of Fig. 2.
Figure 11:
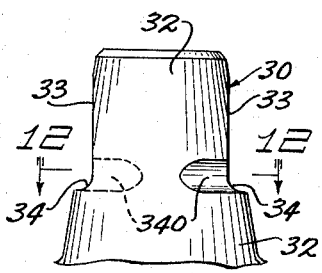
Fig. 11 is a fragmentary side elevational view of the tapered shanked tool taken on the lines 11—11 of Fig. 10.
Figure 12:
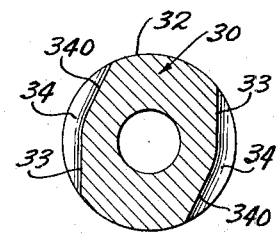
Fig. 12 is a horizontal sectional view of the tapered shanked tool taken on the line 12—12 of Fig. 2.

In the foregoing locked position, the tapered shanked tool 30 is locked in positive non-binding working engagement in the tool holder 20 with the tapers 23 and 32 mated and cooperating. When the tapered shanked tool 30 is turned by hand counterclockwise as viewed in Fig. 3, the retainer lugs 29 of the locking springs 27 of the tool holder are compressed until the flat surfaces 33 of the tapered shank 32 of the tapered shanked tool 30 become positioned parallel to the locking pins 24 of the tool holder 20 whereupon the tapered shanked tool 30 may be withdrawn easily and freely from the said tool holder 20. The locking spring and cam action by means of which the positive non-binding locking of a tapered shanked tool 30 in the tool holder 20 is clearly shown in the drawings, particular reference being made to Figs. 2, 5, and 8 where the tapered shanked tool 30 is inserted in the tool holder 20 and to Figs. 1, 6 and 9 where the tapered shanked tool 30 has been turned into locking engagement within the said tool holder 20. The cam action is shown best in Figs. 1, 2, 5 and 6 and the locking spring action is shown best in Figs. 1, 2, 7, 8 and 9.

Although but a single embodiment of the invention has been disclosed and described in detail, it is obvious that many changes may be made in the size, shape, arrangement and detail of the various elements of the invention without departing from the spirit and scope thereof as defined by the appended claims.

I claim:

1. In combination, a tool holder having an axially disposed female taper therein including an internal annular groove and an anchoring aperture disposed in the groove; and a complementarily tapered shanked tool having the upper portion of the tapered shank thereof formed axially flat on opposite sides and having a pair of locking cams formed at the base of the said flattened opposite sides thereof extending part way around the said tapered shank therefrom, a pair of locking pins extending through the said tool holder communicating with the female taper therein engageable by the cams formed in said tapered tool shank when the said tapered tool shank is inserted into the female taper in the said tool holder with the flattened sides thereof parallel to the said locking pins and then turned a partial turn with respect to the said tool holder, resilient means within the annular groove of said tool holder for maintaining the said tapered shanked tool in its locked position therein and an anchorage nib on said resilient means seated in the anchoring aperture of said holder.

2. In combination, a tool holder having an axially disposed female taper therein and a complementarily tapered shanked tool having the upper portion of the tapered shank thereof formed axially flat on opposite sides and having a pair of locking cams formed at the base of the said flattened opposite sides thereof extending part way around the said tapered shank therefrom, a pair of locking pins extending through the said tool holder communicating with the female taper therein engageable by the cams formed in said tapered tool shank when the said tapered tool shank is inserted into the female taper in the said tool holder with the flattened sides thereof parallel to the said locking pins and then turned a partial turn with respect to the said tool holder, the said tool holder having an internal circumferential radially disposed groove and a communicating anchoring groove therein, a resilient cam means disposed in said groove adapted to engage the said flattened sides of the tapered tool shank and removably hold the said tool in the said tool holder when turned with respect thereto and an anchorage nib on said resilient means seated in the anchoring aperture of said holder.

3. In combination, a tool holder having an axially disposed female taper therein and a complementarily tapered shanked tool having the upper portion of the tapered shank thereof formed axially flat on opposite sides and having a pair of locking cams formed at the base of the said flattened opposite sides thereof extending part way around the said tapered shank therefrom, a pair of locking pins extending through the said tool holder communicating with the female taper therein engageable by the cams formed in said tapered tool shank to cause the said male and female tapers to mate when the said tapered tool shank is inserted into the female taper in the said tool holder with the flattened sides thereof parallel to the said locking pins and then turned a partial turn with respect to the said tool holder, the said tool holder having an internal circumferential radially disposed groove having an anchoring aperture therein, a resilient cam disposed in said groove adapted to engage the said flattened sides of the tapered tool shank and removably hold the said tool in the said tool holder when turned with respect thereto and an anchorage nib on said resilient cam seated in the anchoring aperture of said holder.

RALPH A. EDENS.

REFERENCES CITED

The following references are of record in the file of this patent:

UNITED STATES PATENTS

| Number | Name | Date |
|---|---|---|
| 1,413,280 | Kengel | Apr. 18, 1922 |
| 1,886,177 | Gairing | Nov. 1, 1932 |
| 1,975,877 | Thomas | Oct. 9, 1934 |

FOREIGN PATENTS

| Number | Country | Date |
|---|---|---|
| 214,669 | Switzerland | of 1941 |